United States Patent
Kang et al.

(10) Patent No.: US 12,517,604 B2
(45) Date of Patent: *Jan. 6, 2026

(54) TOUCH SCREEN CONTROLLER FOR DETERMINING RELATIONSHIP BETWEEN A USER'S HAND AND A HOUSING OF AN ELECTRONIC DEVICE

(71) Applicants: STMICROELECTRONICS ASIA PACIFIC PTE LTD, Singapore (SG); STMICROELECTRONICS (BEIJING) R&D CO., LTD., Beijing (CN)

(72) Inventors: Tae-gil Kang, Seoul (KR); Hang Yin, Beijing (CN); Cam Chung La, Singapore (SG)

(73) Assignees: STMICROELECTRONICS ASIA PACIFIC PTE LTD, Singapore (SG); STMICROELECTRONICS (BEIJING) R&D CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,576

(22) Filed: Jul. 7, 2022

(65) Prior Publication Data
US 2022/0334671 A1    Oct. 20, 2022

Related U.S. Application Data

(62) Division of application No. 15/151,247, filed on May 10, 2016, now Pat. No. 11,416,095.

(30) Foreign Application Priority Data
Apr. 26, 2016   (CN) .................... 201610266876.X

(51) Int. Cl.
*G06F 3/041*  (2006.01)
*G06F 3/044*  (2006.01)

(52) U.S. Cl.
CPC ........ *G06F 3/0416* (2013.01); *G06F 3/04166* (2019.05); *G06F 3/044* (2013.01); *G06F 3/0446* (2019.05)

(58) Field of Classification Search
CPC .......................... G06F 3/0416; G06F 3/04166
See application file for complete search history.

(56) References Cited

U.S. PATENT DOCUMENTS

| | | | |
|---|---|---|---|
| 2005/0122785 A1* | 6/2005 | Umeda ............... | G06V 40/1306 365/187 |
| 2009/0174679 A1* | 7/2009 | Westerman ........... | G06F 3/0488 345/173 |

(Continued)

FOREIGN PATENT DOCUMENTS

| CN | 101644979 A | 2/2010 |
|---|---|---|
| CN | 202956741 U | 5/2013 |
| CN | 205959172 U | 2/2017 |

OTHER PUBLICATIONS

Second Office Action and Search Report for counterpart CN Appl. No. 201610266876.X, report dated Oct. 14, 2023, 5 pgs.

(Continued)

*Primary Examiner* — William Boddie
*Assistant Examiner* — Andrew B Schnirel
(74) *Attorney, Agent, or Firm* — Crowe & Dunlevy LLC

(57) ABSTRACT

An electronic device includes a touch screen for a touch sensitive display carried by a portable housing. The electronic device is configured to operate in a high detection threshold mode to determine whether an object is in contact with the touch sensitive display, and operate in a low detection threshold mode to determine whether the object is adjacent to the touch sensitive display, based on lack of (Continued)

detection of the object being in contact with the touch sensitive display. The electronic device is further configured to determine whether the object s in contact with a peripheral edge of the portable housing by determining whether the object is adjacent opposite sides of the touch sensitive display, based on detection of the object being adjacent to the touch sensitive display.

27 Claims, 16 Drawing Sheets

(56) References Cited

U.S. PATENT DOCUMENTS

| | | |
|---|---|---|
| 2011/0148915 A1 | 6/2011 | Kim |
| 2011/0261007 A1 | 10/2011 | Joharapurkar et al. |
| 2012/0050216 A1* | 3/2012 | Kremin ............. G06F 3/041661 |
| | | 345/174 |
| 2012/0075220 A1 | 3/2012 | Matsui et al. |
| 2013/0033434 A1 | 2/2013 | Richardson et al. |
| 2013/0244731 A1* | 9/2013 | Oishi ................. G06F 3/04166 |
| | | 455/566 |
| 2014/0351768 A1 | 11/2014 | Park |
| 2015/0253927 A1* | 9/2015 | Noto ..................... G06F 3/0446 |
| | | 345/174 |

OTHER PUBLICATIONS

First Office Action and Search Report for counterpart CN Appl. No. 201610266876.X, report dated Apr. 30, 2023, 16 pgs.

\* cited by examiner

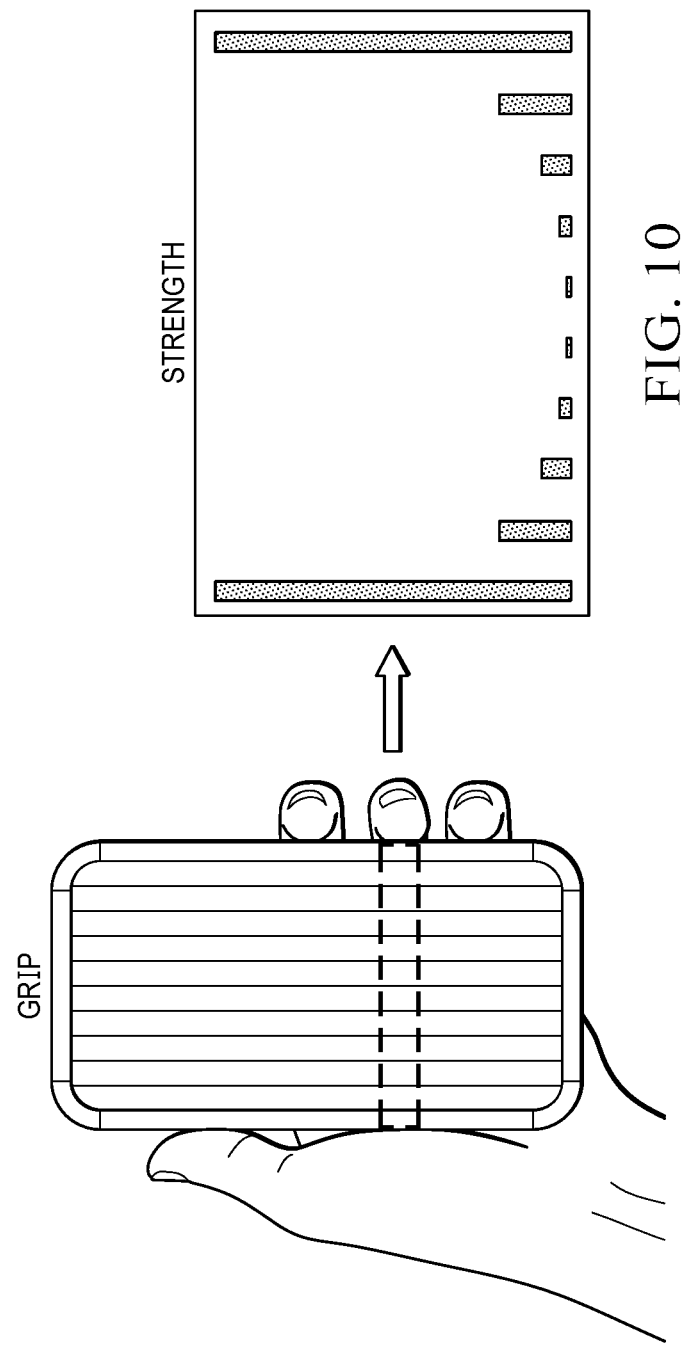

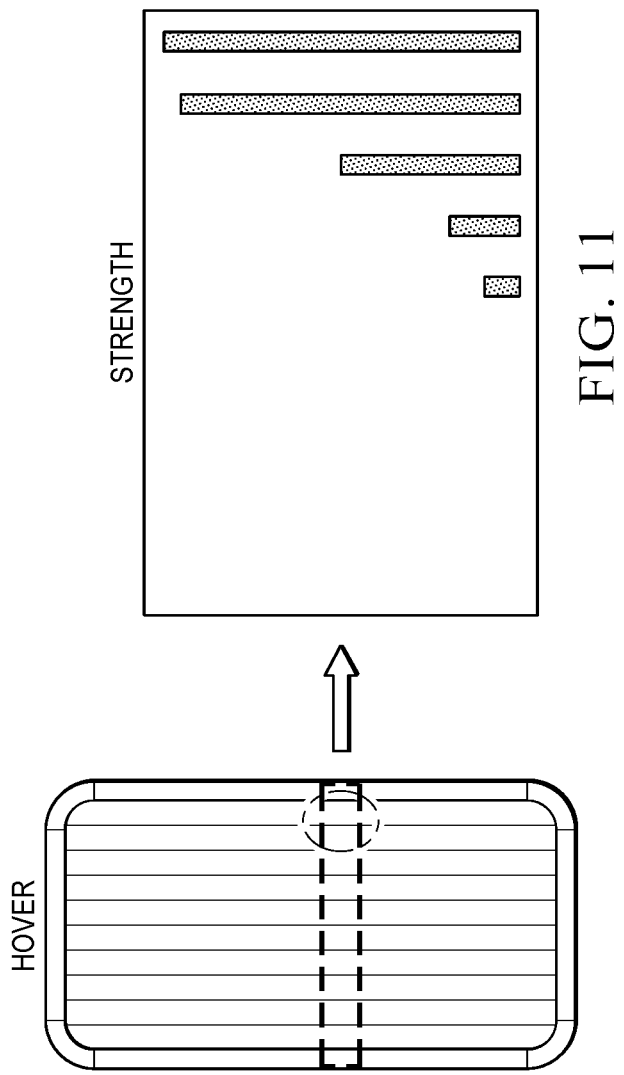

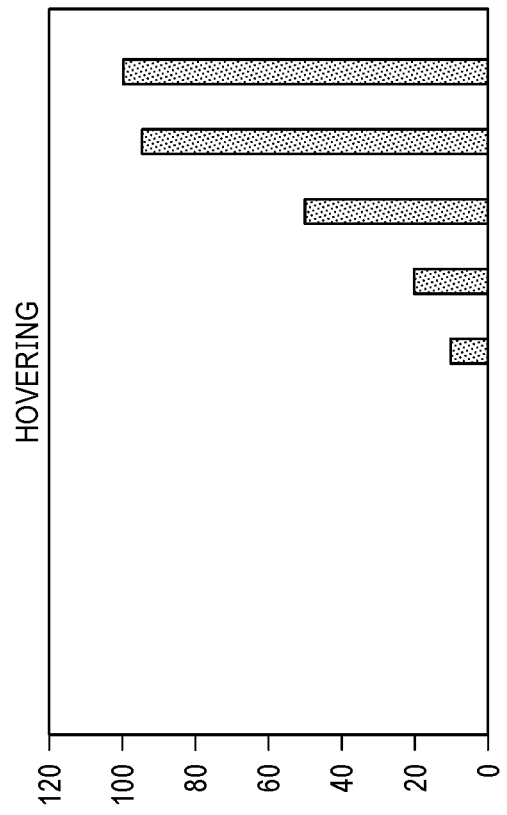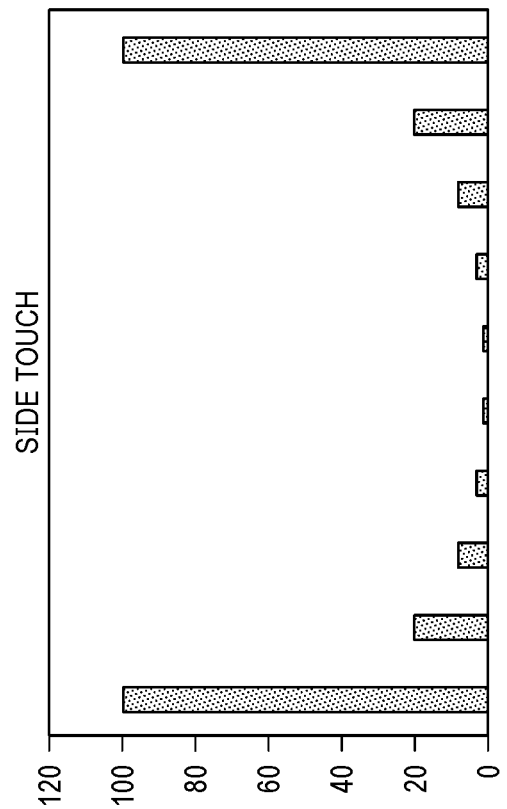
FIG. 12

TOUCH SCREEN CONTROLLER FOR DETERMINING RELATIONSHIP BETWEEN A USER'S HAND AND A HOUSING OF AN ELECTRONIC DEVICE

RELATED APPLICATION

This application is a divisional of U.S. patent application Ser. No. 15/151,247, filed May 10, 2016, which claims priority to Chinese Patent Application No. 201610266876.X filed Apr. 26, 2016, the contents of which are incorporated by reference in their entirety to the maximum extent allowable under the law.

TECHNICAL FIELD

The present disclosure relates generally to touch screens and more specifically to techniques for determining a relationship between a user's hand and a housing of an electronic device.

BACKGROUND

Touch screens are present in many different types of common modern electronic devices, such as smartphones, tablets, smartwatches, wearables, laptop computers, and so on. In these electronic devices the touch screen serves as an output device as well as an input device. The touch screen typically includes display layer and a sensing layer. A touch screen controller is coupled to the sensing layer and operates to process signals therefrom to detect inputs by a user. The sensing layer includes touch sensors, and is attached to or formed as an integral part of the display layer, which may be a LCD, IPS, or AMOLED display, for example.

A typical sensing layer of a touch screen is a capacitive sensor array including a number of force or drive lines and orthogonally arranged sense lines. These lines are made from suitable conductive materials, the drive lines are formed on one sub-layer of the sensing layer and the sense lines formed on another sub-layer, with these sub-layers being separated by a transparent insulating material such as an insulating dielectric layer. The overlap of the drive lines and the orthogonally arranged sense lines with the insulating material between forms an array of capacitive sensors. In operation, a drive signal, which is typically a periodic waveform such as a pulse train, is applied successively to the drive lines. As the drive signal is applied to a given drive line, the capacitive coupling between that drive line and the sense lines results in capacitive coupling of the drive signal to the sense lines to thereby generate sense signals on the sense lines responsive to the drive signal.

The value of the sense signal generated on each sense line is a function of the capacitive coupling between that sense line and the drive line receiving the drive signal. This capacitive coupling changes in response to a user's hand being proximate the sensor nodes formed at the overlap of the drive and sense lines. This change in capacitive coupling of the drive signal to the sense lines will result in a change in the sense signal generated on the sense lines, and in this way the sense signals indicate whether a user's finger or other touch device is adjacent a given sensor node in the touch panel.

In operation, a user touches a surface of the touch panel or hovers his or her finger above the touch panel, and the capacitive sensors generate corresponding electronic sensor signals that are provided to the touch screen controller. From these sensor signals, the touch screen controller determines touch data values (referred to as strength values), from these strength values determines the type of touch event or hover event input by the user to the touch screen, and then provides this information to processing circuitry, such as a host controller, in the electronic device.

As devices incorporating touch screens grow more complex in functionality provided, the providing of additional input paradigms to a user is desirable. Since users are now accustomed to using touch based interfaces, it is desirable to develop new ways of using the capacitive sensors in a touch panel to form new user interface paradigms, and also to provide information about the way the user is interfacing with the device (i.e. holding the device, laying the device flat on a surface, etc.) to the processing circuitry.

SUMMARY

Disclosed herein is an electronic device, including a touch screen controller for a touch sensitive display carried by a portable housing. The touch screen controller is configured to: operate in a high detection threshold mode to determine whether an object is in contact with the touch sensitive display; wherein, when operating in the high detection threshold mode, the touch screen controller drives each force line of the touch sensitive display; operate in a low detection threshold mode to determine whether the object is adjacent to the touch sensitive display, based on lack of detection of the object being in contact with the touch sensitive display; wherein, when operating in the low detection threshold mode, the touch screen controller drives a subset of the force lines of the touch sensitive display and scans each sense line of the touch sensitive display; and determine whether the object is in contact with a peripheral edge of the portable housing based on determination of the object being adjacent to the touch sensitive display.

Also disclosed herein is an electronic device, including a portable housing, with a touch sensitive display carried by the portable housing, the touch sensitive display including a plurality of sense lines. A touch screen controller is coupled to the plurality of sense lines. The touch screen controller is configured to: operate in a screen touch detection mode to detect a user's hand being in contact with the touch sensitive display as a function of reading strength values from at least some of the plurality of sense lines; wherein, in the screen touch detection mode, the user's hand is detected as being in contact with the touch sensitive display as a function of read strength values being greater than a first threshold; operate in a portable housing touch detection mode to detect the user's hand being adjacent to the touch sensitive display, based on lack of detection of the user's hand being in contact with the touch sensitive display and as a function of reading strength values from at least some of the plurality of sense lines; where, in the portable housing touch detection mode, the user's hand is detected as being adjacent to the touch sensitive display as a function of read strength values being greater than a second threshold, wherein the second threshold is less than the first threshold; and determine whether the user's hand is in contact with the portable housing by detecting whether the user's hand is adjacent opposite sides of the touch sensitive display, based on detection of the user's hand being adjacent to the touch sensitive display; wherein the touch sensitive display includes a plurality of force lines; wherein, when operating in the screen touch detection mode, the touch screen controller drives each force line of the plurality thereof; and wherein, when operating in the portable housing touch detection mode, the touch screen controller drives a subset of the plurality of force lines and not each of the plurality of force lines but reads strength values from each of the plurality of sense lines.

BRIEF DESCRIPTION OF THE DRAWINGS

FIG. 10 illustrates the profile of strength values determined from the sense lines of the electronic device when a user is gripping the portable housing of the electronic device.

FIG. 11 illustrates the profile of strength values determined from the sense lines of the electronic device when a user is hovering a finger over the touch screen of the electronic device.

FIG. 12 illustrates a first technique for determining whether a user is gripping the portable housing of the electronic device or whether the user is hovering a finger over the touch screen of the electronic device.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
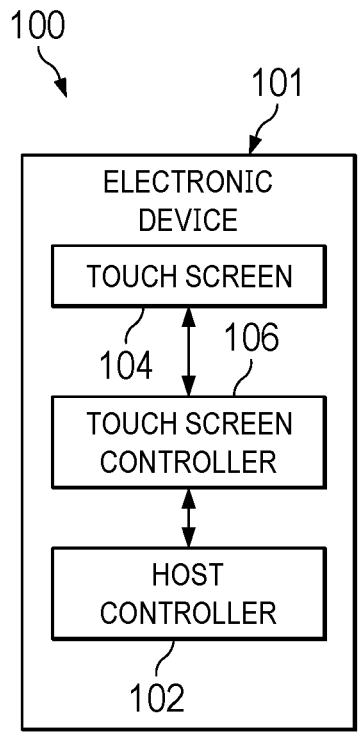
FIG. 1 is a block diagram of an electronic device on which the techniques described herein may be implemented.
Figure 2:
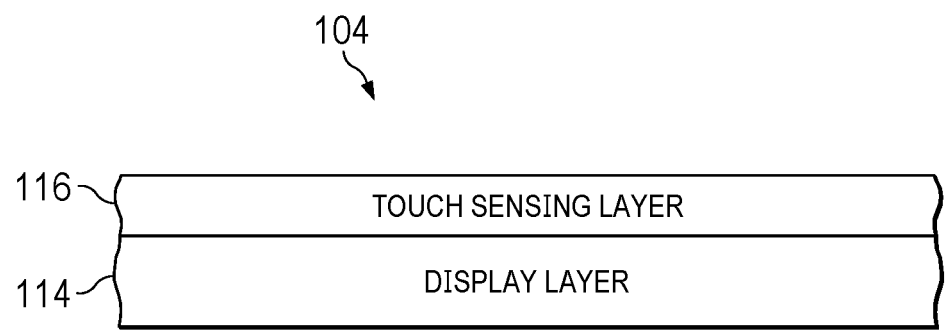
FIG. 2 is a cutaway view of the touch sensitive display of the touch screen of FIG. 1 showing the components thereof.
Figure 3:
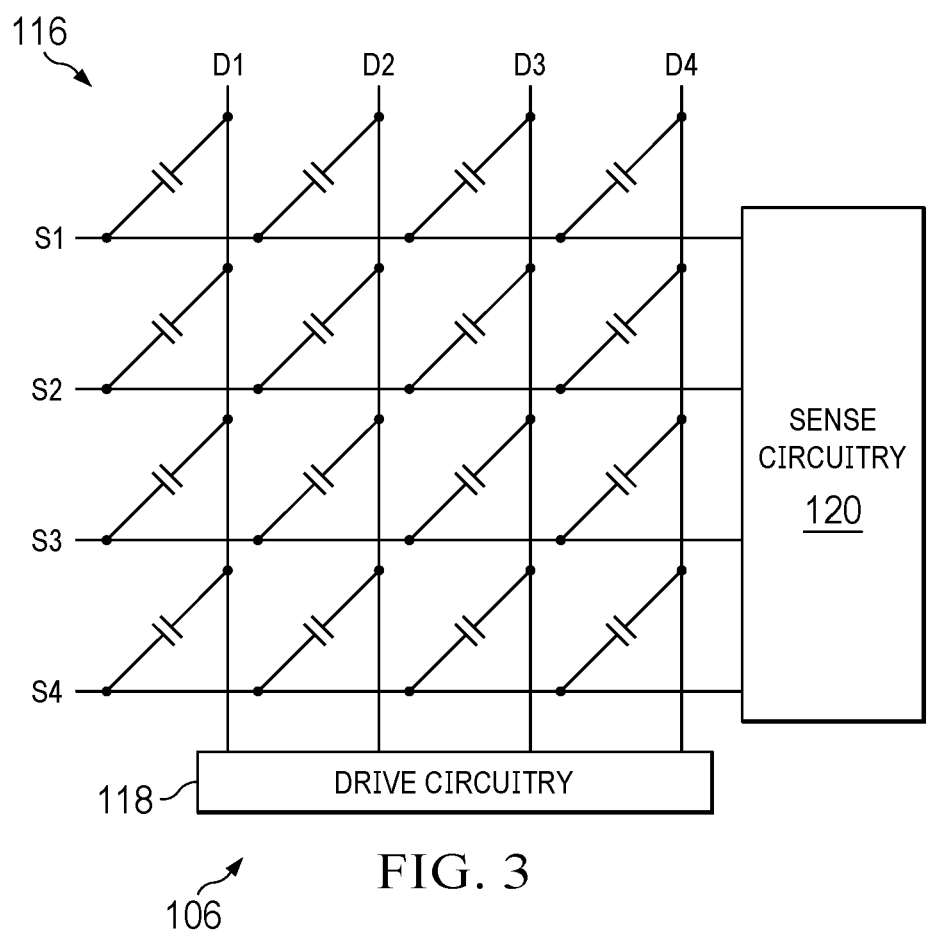
FIG. 3 is a schematic block diagram of the touch screen controller of FIG. 1, and its interconnection with the sense and drive lines of the touch sensing layer of the touch sensitive display of FIG. 2.

With initial reference to FIGS. 1-3 an electronic device 100 is now described. The electronic device 100 may be a smartphone, smartwatch, wearable, tablet, laptop, or other suitable portable electronic device. The electronic device 100 includes a host controller 102 that receives input from a touch screen controller 106, which itself receives input from a touch screen 104. The output provided by the touch screen controller 106 to the host controller 102 as input includes information such as locations of touches on the touch screen 104, whether the touch screen 104 was tapped and where, the location and type of gesture performed on the touch screen 104, etc.

The touch screen 104 includes a display layer 114, with a touch sensing layer 116 adjacent thereto. The touch sensing layer 116 includes drive lines D1-D4 that intersect sense lines S1-S4 at some locations. The sense lines S1-S4 are coupled to the touch screen controller 106, while the drive lines D1-D4 are coupled to drive circuitry 118. At each intersection point between the drive line D1 and the sense lines S1-S4, a capacitance is formed.

In operation, the driving circuitry 118 drives the drive lines D1-D4 with periodic signals, such as sine waves or square waves. At certain intersection points between the drive lines D1-D4 and the sense lines S1-S4, touch sensors are formed, the respective sense line S1-S4 incurs a charge injection proportional to the voltage at the drive lines D1-D4, and a capacitance between the respective sense line S1-S4 and the drive lines D1-D4 is at the sensor of that intersection point. These capacitances vary in proximity to conductive objects, such as human fingers and styluses, and are measured by the touch screen controller 106 and processed to be touch data values stored in a matrix having entries that correspond to the various intersections of the drive lines D1-D4 with the sense lines S1-S4.

In some scenarios, it may be desirable for the host controller 102 to receive information regarding the relationship between the user's hand and the portable housing 101 of the electronic device 100. To that end, the touch screen controller 106 of this disclosure is capable of operating in a high detection threshold mode and a low detection threshold mode. In the high detection threshold mode, the strength measurement on a sense line that results in the registering of a touch is greater than the strength measurement on a sense line that results in the registering of a touch in the low detection threshold mode. Stated another way, in the low detection threshold mode, the gain or sensitivity of the touch screen controller 106 is increased so as to enable detection of the user's hand (or stylus, in some applications) in contact with the portable housing 101 but not with the touch screen 104; in the high detection threshold mode, the gain or sensitivity is decreased as to enable precise detection of the location of a touch of the user's hand on the touch screen 104.

Figure 4:
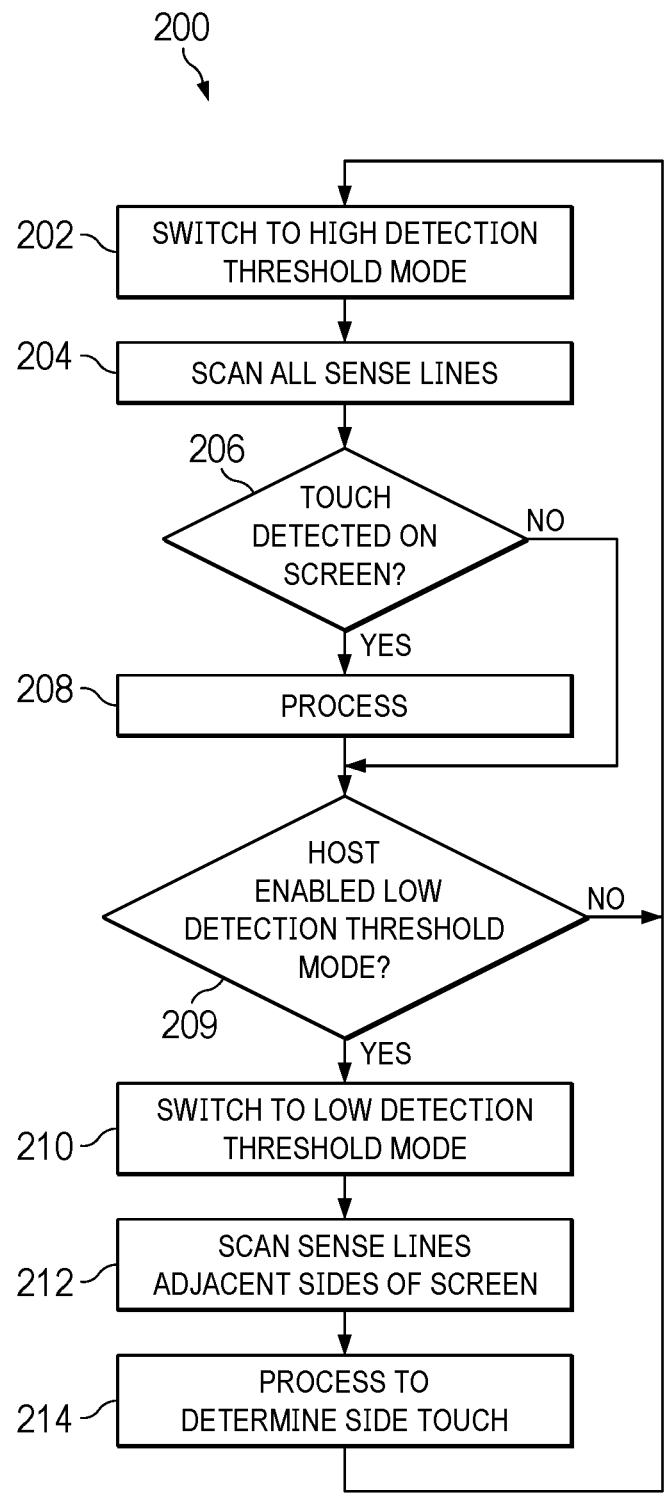
FIG. 4 is a flowchart describing operation of techniques for determining the relationship between a user's hand and a portable housing of an electronic device such as that shown in FIG. 1, in accordance with this disclosure.

Operation of this touch screen controller 106 will now be described with initial reference to FIG. 4. Here, the touch screen controller 106 enters the high detection threshold mode with a decreased gain/sensitivity (Block 202), and then scans the sense lines S1-S4 (Block 204) for strength values. Where a touch is detected (Block 206), the touch screen controller then processes those strength values (Block 208) and ultimately generates data for use by the host controller 102. Where a touch is not detected, the host controller 102 causes the touch screen controller 106 (Block 209) to enter into a low detection threshold mode with an increased gain/sensitivity (Block 210).

Once in the low detection threshold mode, the touch screen controller 106 then scans one or more sense lines S1, S4 adjacent the sides of the touch screen 104 (Block 212), but does not scan sense lines S2, S3 that are not adjacent the sides of the touch screen 104. The touch screen controller 106 then processes the resulting strength values to determine whether a touch to the side of the portable housing 101 of the electronic device 100 has been made (Block 214). That information is then passed to the host controller 102, and the touch screen controller 106 then returns to the high detection threshold mode (Block 202). This described process then repeats.

It should be noted that in some cases in the low detection threshold mode, the touch screen controller 106 drives one or more of the force lines D1, D4 adjacent the sides of the touch screen 104 instead, but does not drive force lines D2, D3 that are not adjacent the sides of the touch screen. The touch screen controller 106, in this mode, scans each sense line S1-S4. The touch screen controller 106 then processes the resulting strength values to determine whether a touch to the side of the portable housing 101 of the electronic device 100 has been made (Block 214). That information is then passed to the host controller 102, and the touch screen controller 106 then returns to the high detection threshold mode (Block 202). This described process then repeats.

Thus, as has been described, the touch screen controller 106 switches back and forth between the high detection threshold mode and the low detection threshold mode. It should be understood that the touch screen controller 106 may spend equal amounts of time (or clock cycles) in each of these modes, or may spend more time (or clock cycles) in one mode than in another mode.

By analyzing the strength values obtained when the user's hand is adjacent to but not touching the touch screen 104, the touch screen controller 106 or host controller 102 can determine whether the user is gripping the portable housing 101, whether the user has tapped the portable housing 101, or whether the user has performed a gesture on the portable housing 101.

Before this stage of the analysis or processing is performed though, it may be helpful to determine whether the user's hand is actually in contact with the portable housing 101, or whether the user is hovering a finger over the touch screen 104.

As can be seen on FIG. 10, when gripping the portable housing 101, the user is typically gripping on opposing sides, which results in the illustrated strength profile. However, when the user is merely hovering a finger over the touch screen 104, the resulting strength profile is as shown in FIG. 11. By determining which strength profile is read by the touch screen controller 106, the difference between a grip and a hover can thereby be determined.

One way to make the determination of which strength profile the readings of the sense lines S1-S4 best fits is by comparing the strengths of the two sense lines most adjacent a given side (or in the case where all sense lines S1-S4 are read but not all force or drive lines D1-D4 are driven, the reading of each sense line when two drive lines most adjacent the given side are activated). If the strength of the sense line most adjacent a given side (or the strength of each sense line when the drive line most adjacent the given side is activated) is above a given threshold (as shown in FIG. 12, value 80), and the strength of the sense line adjacent that sense line (or the strength of each sense line when the drive line adjacent the drive line most adjacent the given side is activated) is below a given threshold (as shown in FIG. 12, value 50), and this strength remains for a given period of time, the touch screen controller 106 or host controller 102 can determine that the user is gripping the portable housing 101 of the electronic device 100.

Likewise, if the strength of the sense line most adjacent a given side (or the strength of each sense line when the drive line most adjacent the given side is activated) is above a given threshold and the strength of the sense line adjacent that sense line (or the strength of each sense line when the drive line adjacent the drive line most adjacent the given side is activated) is below a given threshold, and if a similar pattern is present for the opposite side, then the touch screen controller 106 or host controller 102 can determine that the user is gripping the portable housing 101 of the electronic device 100. However, if the strength of the two sense lines (for example, S3-S4) is similar (or if the strength of each sense line as two drive lines are activated), with both being above their respective thresholds, then the touch screen controller 106 or host controller 102 can determine that the user is hovering a finger over the touch screen 104.

Figure 13:
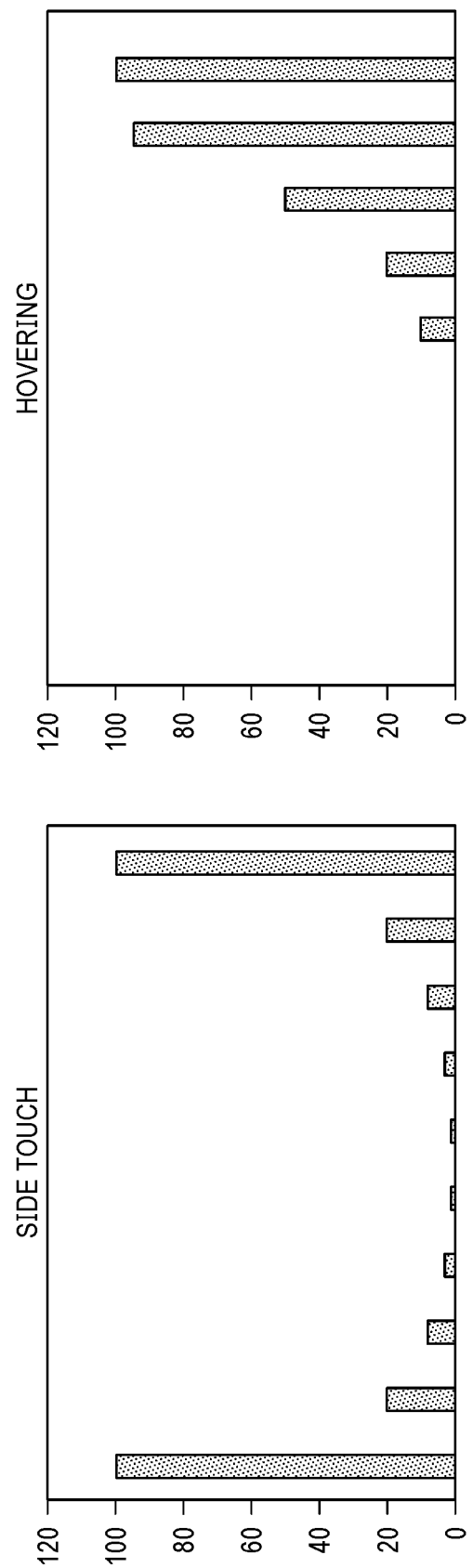
FIG. 13 illustrates a second technique for determining whether a user is gripping the portable housing of the electronic device or whether the user is hovering a finger over the touch screen of the electronic device.

Rather than having the second threshold be a set value, the second threshold may instead be a set percentage of a maximum possible strength reading of the sense line most adjacent the side of the touch screen 104, as shown in FIG. 13.

In either case, where a hover is detected, data values representing the location of the hovering finger over the touch screen 104 may be determined by the touch screen controller 106 and sent to the host controller 102. Alternatively, these data values may not be sent.

Figure 5A:
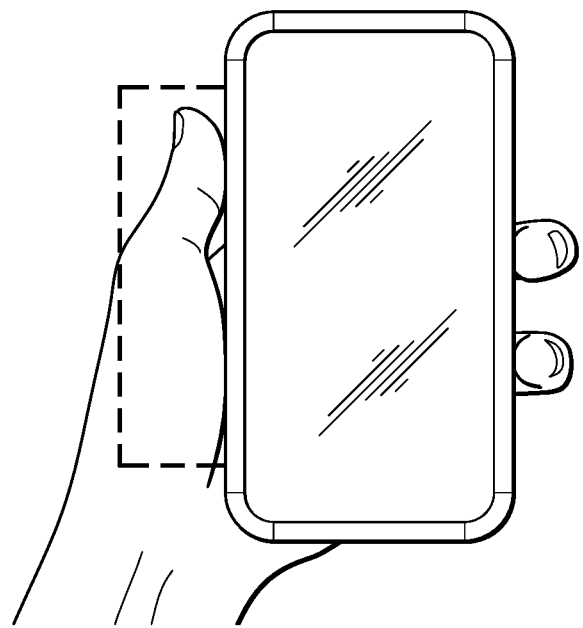
FIGS. 5A-5C illustrate a first technique for determining that a user's hand is gripping the portable housing of the electronic device.
Figure 5B:
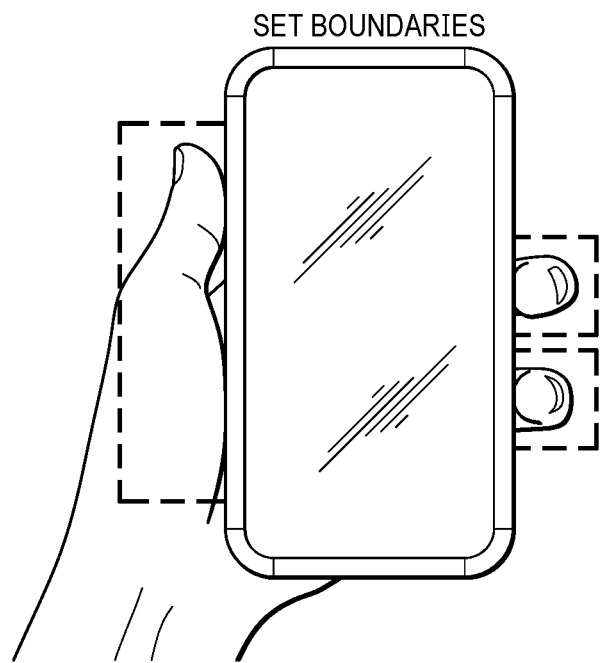
Figure 5C:
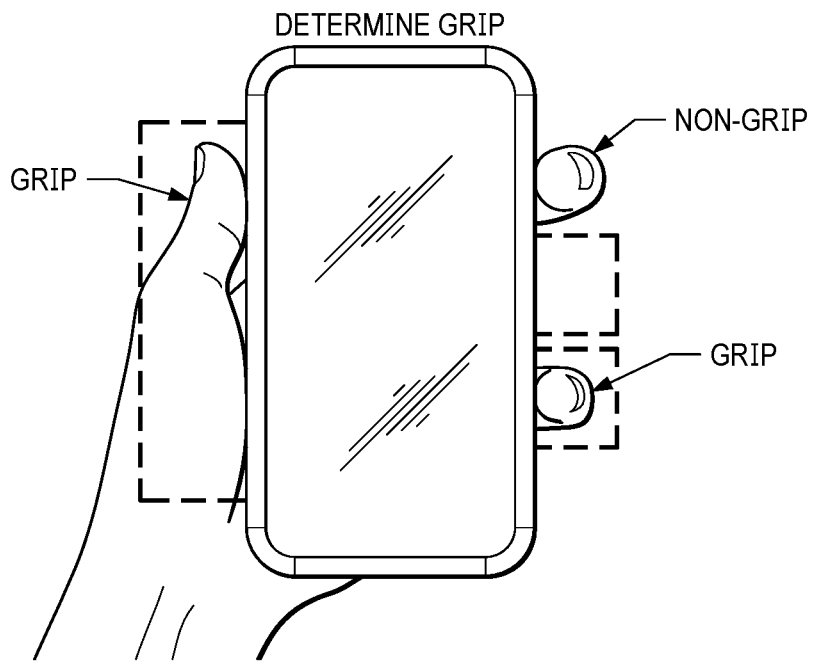

With reference to the series shown in FIGS. 5A-5C, a first technique for determining that a user is gripping the portable housing 101 of the electronic device 100 is now described. Here, once the touch screen controller 106 detects strength values of the sense lines that could indicate that a user's hand is gripping the portable housing 101 (FIG. 5A), it defines boundaries about the locations where those strength values indicate parts of the user's hand may be (FIG. 5B). If those parts of the hand stay within those boundaries for a given period of time, then the fact that the user is gripping the portable housing 101 is determined (FIG. 5C).

Figure 6A:
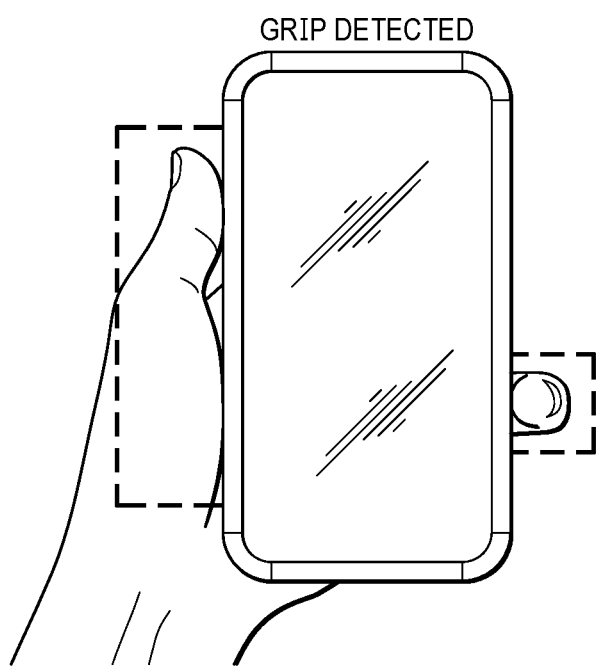
FIGS. 6A-6D illustrate a technique for determining that a user's hand is gripping the portable housing of the electronic device where the user initially grips the housing with two fingers, and thereafter adds another finger to the grip.
Figure 6B:
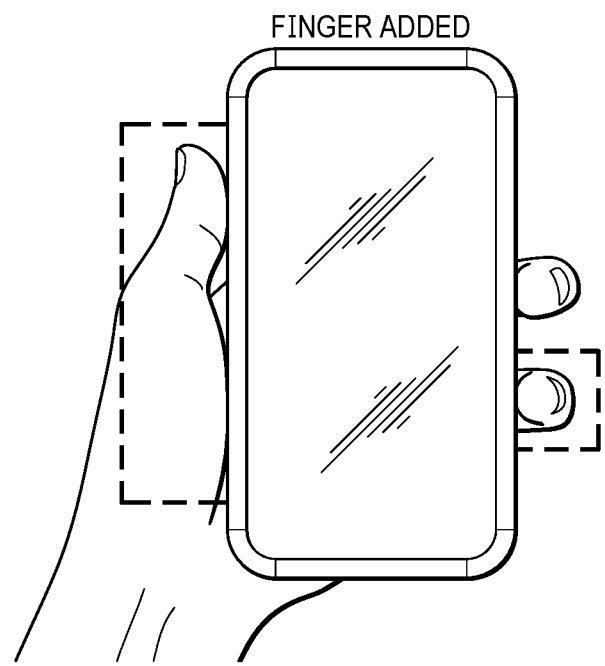
Figure 6C:
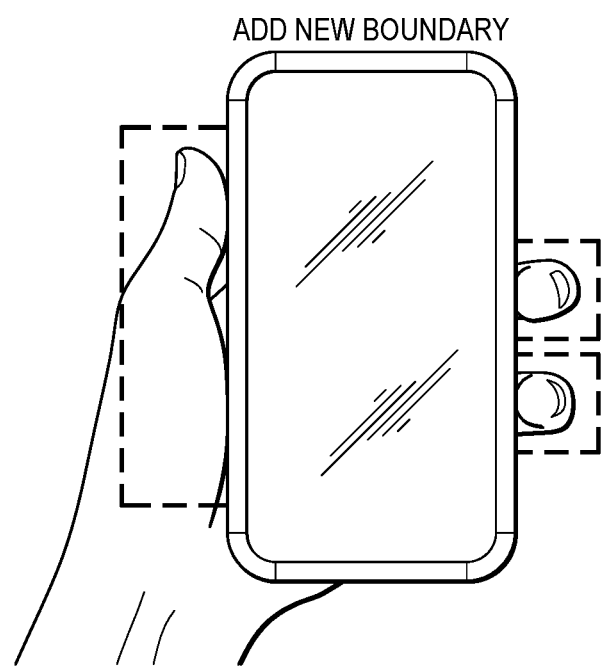
Figure 6D:
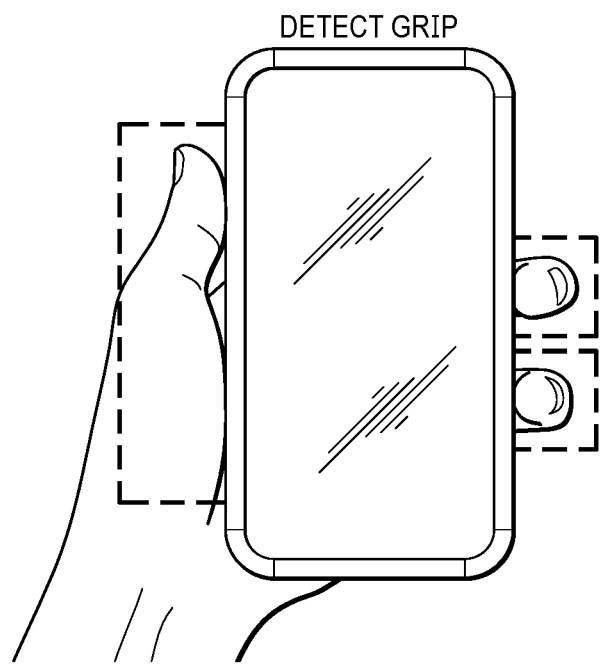

In some cases, the user may initially grip the portable housing 101 with a first number of fingers, and then later add one or more fingers to the grip. Such a scenario is depicted in the series shown in FIGS. 6A-6D, where the user initially grasps the portable housing 101 with a first set of fingers (FIG. 6A), then later adds another finger (FIG. 6B). In this case, the touch screen controller 106 may then define a new boundary for the newly added finger (FIG. 6C), and if that newly added finger stays within the new boundary for a given period of time, then the grip detection may change to be a grip that includes the newly added finger (FIG. 6D).

Figure 7A:
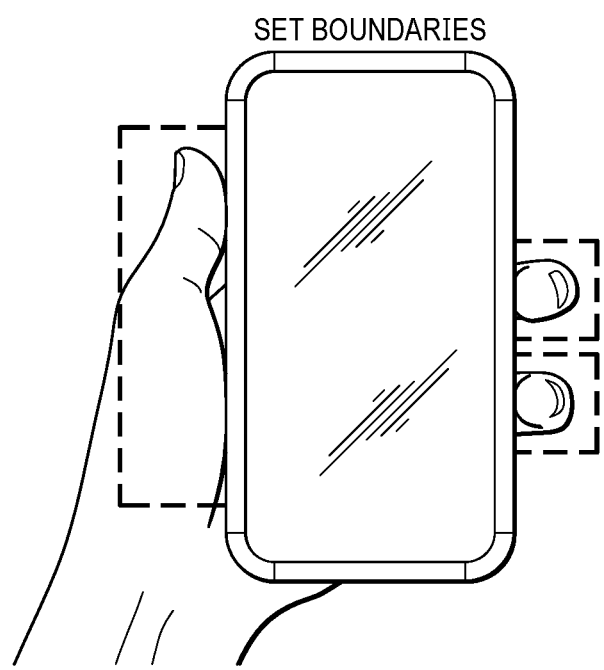
FIGS. 7A-7D illustrate a first technique for detecting that a user has tapped the portable housing of the electronic device.
Figure 7B:
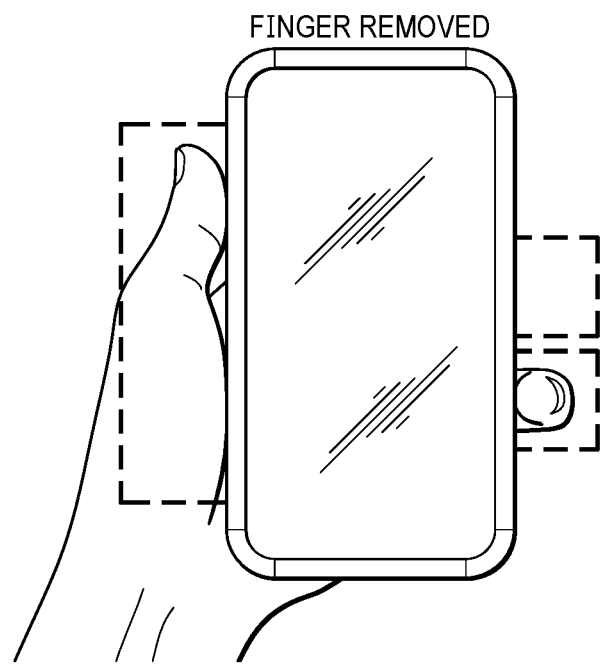
Figure 7C:
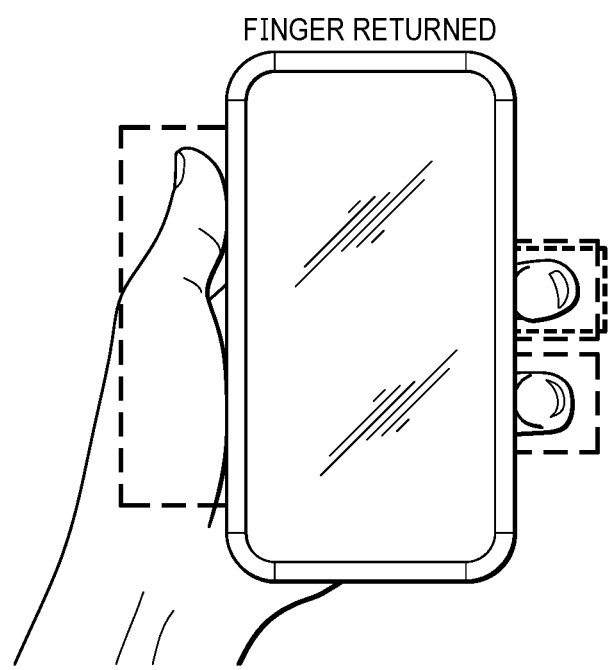
Figure 7D:
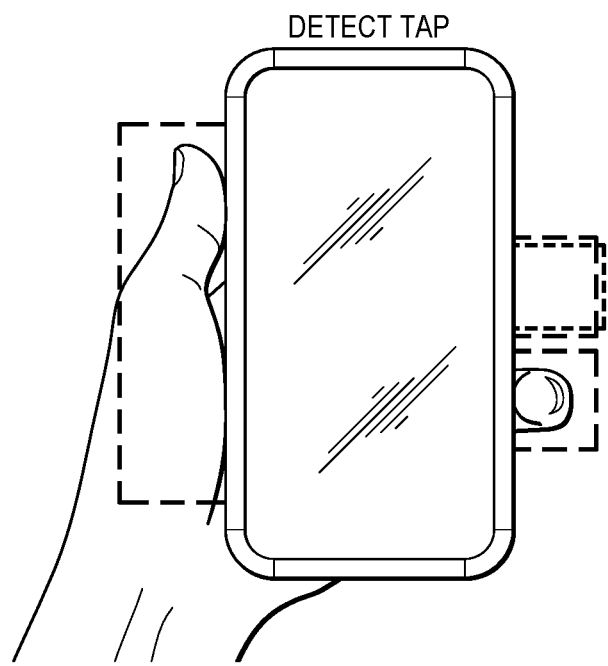

Tap detection is now described with reference to the series shown in FIGS. 7A-7D. Here, once the touch screen controller 106 detects strength values of the sense lines that could indicate that a user's hand is gripping the portable housing 101, it defines boundaries about the locations where those strength values indicate parts of the user's hand may be (FIG. 7A). If a finger is removed from within one of these boundaries (FIG. 7B), and then returned to the proper boundary for a given period of time (FIG. 7C), and then removed from that boundary again, a tap is detected (FIG. 7D). In some applications, the boundary for detection of a tap may be different than the boundary for grip detection.

Figure 8A:
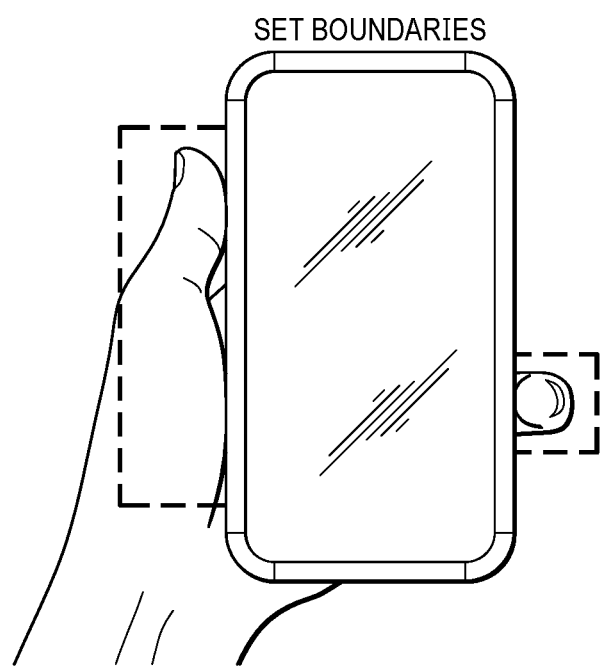
FIGS. 8A-8C illustrate a second technique for detecting that a user has tapped the portable housing of the electronic device.
Figure 8B:
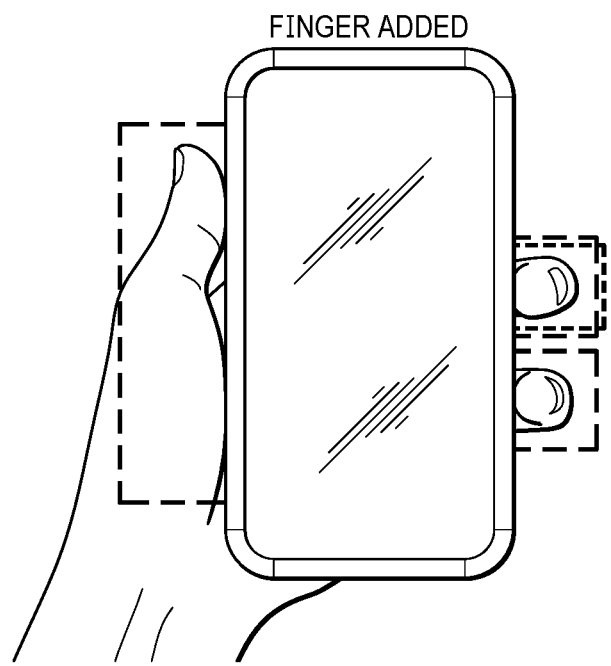
Figure 8C:
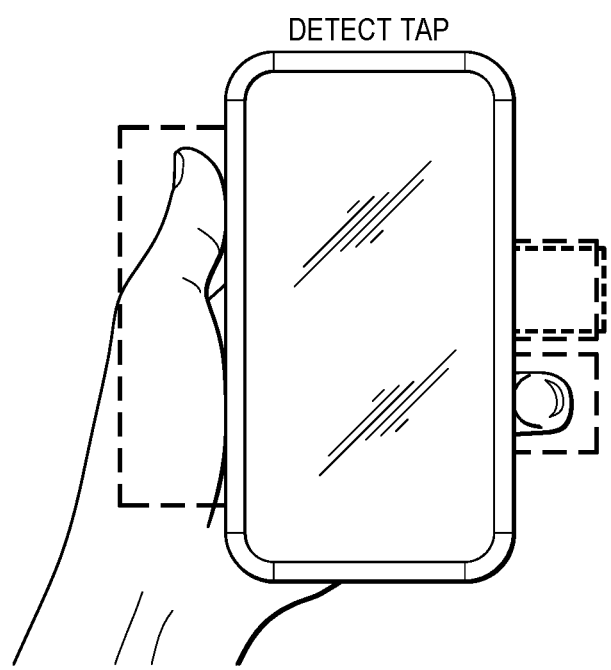

Another technique for tap detection is described with reference to the series of FIGS. 8A-8C. Here, once the touch screen controller 106 detects strength values of the sense lines that could indicate that a user's hand is gripping the portable housing 101, it defines boundaries about the locations where those strength values indicate parts of the user's hand may be (FIG. 8A). If a finger is then added as indicated by strength values, the touch screen controller 106 adds a boundary for the added finger (FIG. 8B). If that finger is present for a given period of time, and then it leaves the side, a tap or side tap is detected (FIG. 8C).

Figure 9A:
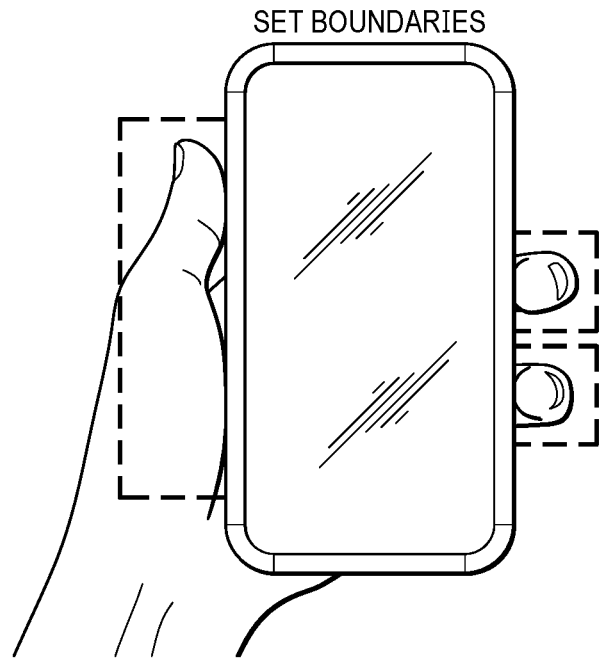
FIGS. 9A-9C illustrate a technique for detecting that a user has performed a gesture on the portable housing of the electronic device.
Figure 9B:
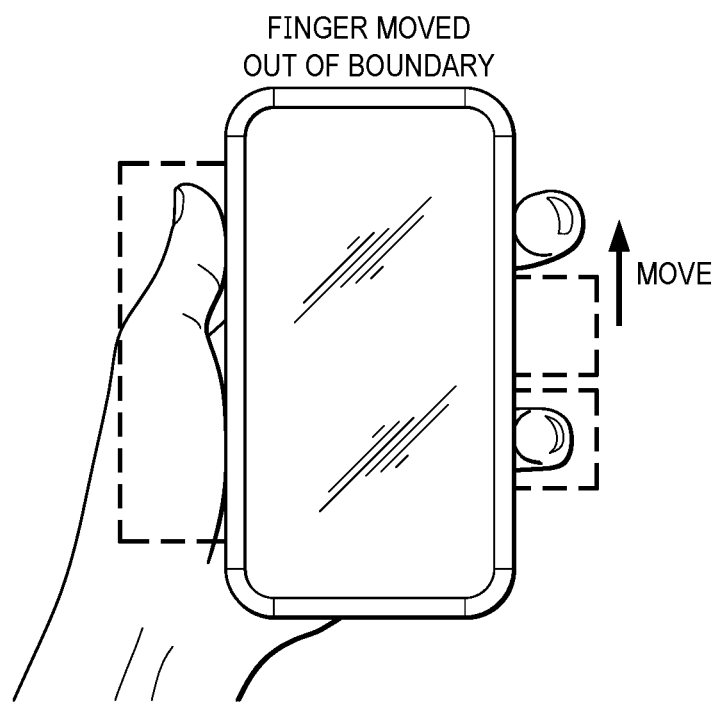
Figure 9C:
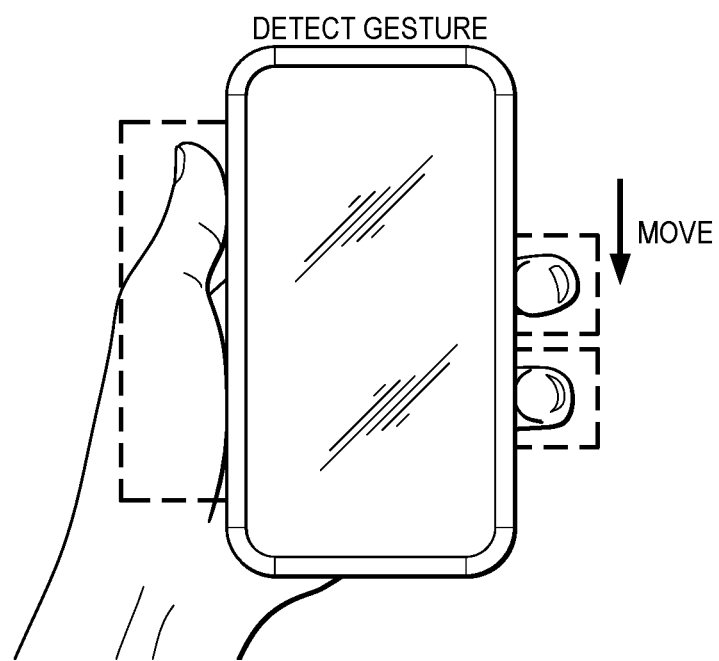

As explained above, gesture detection may also be performed by the touch screen controller 106. This is now described with reference to the series shown in FIGS. 9A-9C. Here, once the touch screen controller 106 detects strength values of the sense lines that could indicate that a user's hand is gripping the portable housing 101, it defines boundaries about the locations where those strength values indicate parts of the user's hand may be (FIG. 9A).

If a finger leaves a defined boundary (FIG. 9B), and then returns to the defined boundary within a given period of time (FIG. 9C), then a gesture or side gesture (here, a sliding motion) is detected.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. An electronic device, comprising:
a touch screen controller for a touch sensitive display carried by a portable housing configured to:
operate in a high detection threshold mode to determine whether an object is in contact with the touch sensitive display;
wherein, when operating in the high detection threshold mode, the touch screen controller drives each force line of the touch sensitive display;
operate in a low detection threshold mode to determine whether the object is adjacent to the touch sensitive display, based on lack of detection of the object being in contact with the touch sensitive display;
wherein, when operating in the low detection threshold mode, the touch screen controller drives a subset of the force lines of the touch sensitive display and scans each sense line of the touch sensitive display; and
determine whether the object is in contact with a peripheral edge of the portable housing based on determination of the object being adjacent to the touch sensitive display;
wherein the touch screen controller determines that the object is hovering above the touch sensitive display based on detection of the object being adjacent to the touch sensitive display but not being adjacent to first and second opposing sides of the touch sensitive display;
wherein the touch screen controller determines whether the object is adjacent to the touch sensitive display by at least one of:
scanning a first plurality of adjacent sense lines for a first side of the touch sensitive display and determining that the object is adjacent the first side as a function of a difference between strength values for each sense line of the first plurality of adjacent sense lines being greater than a threshold; and
scanning a second plurality of adjacent sense lines for a second side of the touch sensitive display opposite to the first side and determining that the object is adjacent the second side as a function of a difference between strength values for each sense line of the second plurality of adjacent sense lines being greater than the threshold.

2. The electronic device of claim 1, wherein the subset of the force lines of the touch sensitive display includes force lines located toward at least one side of the touch sensitive display and not force lines located toward a center of the touch sensitive display.

3. The electronic device of claim 1, wherein the subset of the force lines of the touch sensitive display includes a pair of force lines adjacent sides of the touch sensitive display and excludes other force lines of the touch sensitive display.

4. The electronic device of claim 1, wherein the touch screen controller determines whether the object is adjacent to the touch sensitive display by:
determining whether the object is adjacent to the first side of the touch sensitive display and then determining whether the object is adjacent to the second side of the touch sensitive display opposite from the first side; or
simultaneously determining whether the object is adjacent to first and second opposing sides of the touch sensitive display.

5. The electronic device of claim 1, wherein the touch screen controller determines that the object is hovering above the touch sensitive display by determining that the difference between strength values for each sense line of the first plurality of adjacent sense lines is less than the threshold or by determining that the difference between strength values for each sense line of the second plurality of adjacent sense lines is less than the threshold.

6. The electronic device of claim 1, wherein the touch screen controller determines whether the object is adjacent to the touch sensitive display by at least one of:
driving a first plurality of adjacent force lines for the first side of the touch sensitive display and determining that the object is adjacent the first side as a function of a difference between strength values for sense lines of the touch sensitive display intersecting different ones of the first plurality of adjacent force lines being greater than a threshold; and
driving a second plurality of adjacent force lines for the second side of the touch sensitive display opposite to the first side and determining that the object is adjacent the second side as a function of a difference between strength values for sense lines of the touch sensitive display intersecting different ones of the second plurality of adjacent force lines being greater than the threshold.

7. The electronic device of claim 1, wherein the touch screen controller determines whether the object is adjacent to the touch sensitive display by at least one of:
scanning first and second adjacent sense lines for the first side of the touch sensitive display and determining that the object is adjacent the first side as a function a strength value for the first sense line for the first side being greater than a first threshold and a strength value for the second sense line for the first side being less than a second threshold, the second threshold being less than the first threshold; and
scanning first and second adjacent sense lines for the second side of the touch sensitive display opposite to the first side and determining that the object is adjacent the second side as a function of a strength value for the first sense line for the second side being greater than the first threshold and a strength value for the second sense line for the second side being less than the second threshold.

8. The electronic device of claim 1, wherein the touch screen controller determines whether the object is adjacent to the touch sensitive display by at least one of:
driving first and second adjacent force lines for the first side of the touch sensitive display and determining that the object is adjacent the first side as a function of strength values for sense lines of the touch sensitive display intersecting the first force line for the first side being greater than a first threshold and strength values for sense lines of the touch sensitive display intersecting the second force line for the first side being less than a second threshold, the second threshold being less than the first threshold; and driving first and second adjacent force lines for the second side of the touch sensitive display opposite to the first side and determining that the object is adjacent the second side as a function of a strength value for each sense line intersecting the first force line for the second side being greater than the first threshold and a strength value for each sense line intersecting the second force line for the second side being less than the second threshold.

9. The electronic device of claim 8, wherein the first threshold is predetermined; and wherein the second threshold is defined as a predetermined percentage of a maximum possible strength value for the first sense line for the first side.

10. The electronic device of claim 1, wherein the touch screen controller determines whether the object is adjacent to the touch sensitive display by:

first determining whether the object is adjacent to the first side of the touch sensitive display, and then determining whether the object is adjacent to the second side of the touch sensitive display opposite to the first side; or simultaneously determining whether the object is adjacent to the first side of the touch sensitive display and whether the object is adjacent to the second side of the touch sensitive display opposite to the first side.

11. An electronic device, comprising:

a touch screen controller for a touch sensitive display carried by a portable housing configured to:

operate in a high detection threshold mode to determine whether an object is in contact with the touch sensitive display;

wherein, when operating in the high detection threshold mode, the touch screen controller drives each force line of the touch sensitive display;

operate in a low detection threshold mode to determine whether the object is adjacent to the touch sensitive display, based on lack of detection of the object being in contact with the touch sensitive display;

wherein, when operating in the low detection threshold mode, the touch screen controller drives a subset of the force lines of the touch sensitive display and scans each sense line of the touch sensitive display; and determine whether the object is in contact with a peripheral edge of the portable housing based on determination of the object being adjacent to the touch sensitive display;

wherein the touch screen controller determines whether the object is adjacent to the touch sensitive display by at least one of:

driving a first plurality of adjacent force lines for a first side of the touch sensitive display and determining that the object is adjacent the first side as a function of a difference between strength values for sense lines of the touch sensitive display intersecting different ones of the first plurality of adjacent force lines being greater than a threshold; and driving a second plurality of adjacent force lines for a second side of the touch sensitive display opposite to the first side and determining that the object is adjacent the second side as a function of a difference between strength values for sense lines of the touch sensitive display intersecting different ones of the second plurality of adjacent force lines being greater than the threshold; and wherein the touch screen controller determines that the object is hovering above the touch sensitive display by determining that the difference between strength values for each sense line intersecting different ones of the first plurality of force lines is less than the threshold or by determining that the difference between strength values for each sense line intersecting different ones of the second plurality of force lines is less than the threshold.

12. The electronic device of claim 11, wherein the subset of the force lines of the touch sensitive display includes force lines located toward at least one side of the touch sensitive display and not force lines located toward a center of the touch sensitive display.

13. The electronic device of claim 11, wherein the touch screen controller determines that the object is in contact with the peripheral edge of the portable housing when a similar strength profile is detected on opposite sides of the touch sensitive display.

14. An electronic device, comprising:

a touch screen controller for a touch sensitive display carried by a portable housing configured to:

operate in a high detection threshold mode to determine whether an object is in contact with the touch sensitive display;

wherein, when operating in the high detection threshold mode, the touch screen controller drives each force line of the touch sensitive display;

operate in a low detection threshold mode to determine whether the object is adjacent to the touch sensitive display, based on lack of detection of the object being in contact with the touch sensitive display;

wherein, when operating in the low detection threshold mode, the touch screen controller drives a subset of the force lines of the touch sensitive display and scans each sense line of the touch sensitive display; and determine whether the object is in contact with a peripheral edge of the portable housing based on determination of the object being adjacent to the touch sensitive display;

wherein the touch screen controller determines whether the object is adjacent to the touch sensitive display by at least one of:

scanning first and second adjacent sense lines for a first side of the touch sensitive display and determining that the object is adjacent the first side as a function a strength value for the first sense line for the first side being greater than a first threshold and a strength value for the second sense line for the first side being less than a second threshold, the second threshold being less than the first threshold; and scanning first and second adjacent sense lines for a second side of the touch sensitive display opposite to the first side and determining that the object is adjacent the second side as a function of a strength value for the first sense line for the second side being greater than the first threshold and a strength value for the second sense line for the second side being less than the second threshold;

wherein the touch screen controller determines that the object is hovering above the touch sensitive display by determining that the strength value for at least the second sense line for the first side is greater than the second threshold or by determining that the strength value for the at least second sense line for the second side is greater than the second threshold.

15. The electronic device of claim 14, wherein the touch screen controller determines whether the object is adjacent to the touch sensitive display by first determining whether the object is adjacent to the first side of the touch sensitive display, and then determining whether the object is adjacent to the second side of the touch sensitive display opposite to the first side.

16. The electronic device of claim 14, wherein the second threshold is defined as a set percentage of a maximum possible strength reading of the first sense line for the first side.

17. An electronic device, comprising:
a touch screen controller for a touch sensitive display carried by a portable housing configured to:
operate in a high detection threshold mode to determine whether an object is in contact with the touch sensitive display;
wherein, when operating in the high detection threshold mode, the touch screen controller drives each force line of the touch sensitive display;
operate in a low detection threshold mode to determine whether the object is adjacent to the touch sensitive display, based on lack of detection of the object being in contact with the touch sensitive display;
wherein, when operating in the low detection threshold mode, the touch screen controller drives a subset of the force lines of the touch sensitive display and scans each sense line of the touch sensitive display; and
determine whether the object is in contact with a peripheral edge of the portable housing based on determination of the object being adjacent to the touch sensitive display;
wherein the touch screen controller determines whether the object is adjacent to the touch sensitive display by at least one of:
driving first and second adjacent force lines for a first side of the touch sensitive display and determining that the object is adjacent the first side as a function of strength values for sense lines of the touch sensitive display intersecting the first force line for the first side being greater than a first threshold and strength values for sense lines of the touch sensitive display intersecting the second force line for the first side being less than a second threshold, the second threshold being less than the first threshold; and
driving first and second adjacent force lines for a second side of the touch sensitive display opposite to the first side and determining that the object is adjacent the second side as a function of a strength value for each sense line intersecting the first force line for the second side being greater than the first threshold and a strength value for each sense line intersecting the second force line for the second side being less than the second threshold;
wherein the touch screen controller determines that the object is hovering above the touch sensitive display by determining that the strength values for each sense line intersecting the second force line for the first side is greater than the second threshold or by determining that the strength value for each sense line intersecting the second force line for the second side is greater than the second threshold.

18. The electronic device of claim 17, wherein the first threshold is predetermined; and wherein the second threshold is defined as a predetermined percentage of a maximum possible strength value for the sense lines intersecting the first force line for the first side.

19. The electronic device of claim 17, wherein the touch screen controller is further configured to define boundaries about locations where strength values indicate parts of a user's band may be, and determine that the object is in contact with the peripheral edge of the portable housing when the parts of the user's hand stay within those boundaries for a given period of time.

20. An electronic device, comprising:
a portable housing;
a touch sensitive display carried by the portable housing, the touch sensitive display including a plurality of sense lines; and
a touch screen controller coupled to the plurality of sense lines and configured to:
operate in a screen touch detection mode to detect a user's hand being in contact with the touch sensitive display as a function of reading strength values from at least some of the plurality of sense lines;
wherein, in the screen touch detection mode, the user's hand is detected as being in contact with the touch sensitive display as a function of read strength values being greater than a first threshold;
operate in a portable housing touch detection mode to detect the user's hand being adjacent to the touch sensitive display, based on lack of detection of the user's hand being in contact with the touch sensitive display and as a function of reading strength values from at least some of the plurality of sense lines,
where, in the portable housing touch detection mode, the user's hand is detected as being adjacent to the touch sensitive display as a function of read strength values being greater than a second threshold, wherein the second threshold is less than the first threshold; and
determine whether the user's hand is in contact with the portable housing by detecting whether the user's hand is adjacent opposite sides of the touch sensitive display, based on detection of the user's hand being adjacent to the touch sensitive display;
wherein the touch sensitive display includes a plurality of force lines;
wherein, when operating in the screen touch detection mode, the touch screen controller drives each force line of the plurality thereof; and
wherein, when operating in the portable housing touch detection mode, the touch screen controller drives a subset of the plurality of force lines and not each of the plurality of force lines but reads strength values from each of the plurality of sense lines;
wherein the touch screen controller determines that the user's hand is hovering above the touch sensitive display based on detection of the user's hand being adjacent to the touch sensitive display but not being adjacent to first and second opposing sides of the touch sensitive display.

21. The electronic device of claim 20, wherein the subset of the force lines includes force lines located toward sides of the touch sensitive display and not force lines located toward a center of the touch sensitive display.

22. The electronic device of claim 20, wherein the subset of the force lines includes a pair of force lines adjacent sides of the touch sensitive display and excludes other force lines.

23. The electronic device of claim 20, wherein the touch screen controller detects whether the user's hand is adjacent to the touch sensitive display by:
- detecting whether the user's hand is adjacent to a first side of the touch sensitive display and then detecting whether the user's hand is adjacent to a second side of the touch sensitive display opposite from the first side; or
- simultaneously detecting whether the user's hand is adjacent to first and second opposing sides of the touch sensitive display.

24. The electronic device of claim 20, wherein the touch screen controller determines whether the user's hand is adjacent to opposing sides of the touch sensitive display by:
- reading strength values from a first pair of adjacent sense lines for a first side of the touch sensitive display and determining that the user's hand is adjacent the first side as a function of a difference between the strength values for each sense line of the first pair of adjacent sense lines being greater than a threshold; and
- reading strength values from a second pair of adjacent sense lines for a second side of the touch sensitive display opposite to the first side and determining that the user's hand is adjacent the second side as a function of a difference between the strength values for each sense line of the second pair of adjacent sense lines being greater than the threshold.

25. The electronic device of claim 20, wherein the touch screen controller determines whether the user's hand is adjacent to opposing sides of the touch sensitive display by:
- reading strength values from sense lines intersecting a first pair of adjacent force lines for a first side of the touch sensitive display and determining that the user's hand is adjacent the first side as a function of a difference between the strength values for each sense line intersecting the first pair of adjacent force lines being greater than a threshold; and
- reading strength values from sense lines intersecting a second pair of adjacent force lines for a second side of the touch sensitive display opposite to the first side and determining that the user's hand is adjacent the second side as a function of a difference between the strength values for each sense line intersecting the second pair of adjacent force lines being greater than the threshold.

26. The electronic device of claim 20, wherein the touch screen controller determines whether the user's hand is adjacent to opposing sides of the touch sensitive display by:
- reading strength values for sense lines intersecting first and second adjacent force lines for a first side of the touch sensitive display and determining that the user's hand is adjacent the first side as a function of the strength values for each sense line intersecting the first force line for the first side being greater than a first threshold and the strength values for each sense line intersecting the second force line for the first side being less than a second threshold, the second threshold being less than the first threshold; and
- reading strength values for sense lines intersecting first and second adjacent force lines for a second side of the touch sensitive display opposite to the first side and determining that the user's hand is adjacent the second side as a function of the strength values sense lines intersecting the first force line for the second side being greater than the first threshold and the strength value for the sense lines intersecting the second force line for the second side being less than the second threshold.

27. The electronic device of claim 26, wherein the first threshold is predetermined; and wherein the second threshold is defined as a predetermined percentage of a maximum possible strength value of the sense lines intersecting the first force line for the first side.

* * * * *